United States Patent [19]

Contois et al.

[11] 4,018,606
[45] Apr. 19, 1977

[54] ORGANIC AZO PIGMENT SENSITIZERS FOR PHOTOCONDUCTIVE LAYERS

[75] Inventors: Lawrence E. Contois; Joseph Y. Kaukeinen; Stephen Michel; Thomas M. Plutchak, all of Rochester, N.Y.

[73] Assignee: Eastman Kodak Company, Rochester, N.Y.

[22] Filed: May 3, 1974

[21] Appl. No.: 466,658

[52] U.S. Cl. .................................. 96/1.7; 96/1.6
[51] Int. Cl.$^2$ .................................... G03G 5/09
[58] Field of Search ...................... 96/1, 1.5, 1.6

[56] References Cited

UNITED STATES PATENTS

| | | | |
|---|---|---|---|
| 3,384,632 | 5/1968 | Solodar | 96/1.6 |
| 3,622,341 | 8/1969 | Lee | 96/1.6 |
| 3,684,548 | 8/1972 | Contois | 96/1.6 |
| 3,775,105 | 11/1973 | Kukla | 96/1.6 |

FOREIGN PATENTS OR APPLICATIONS 1,370,197  10/1974  United Kingdom .................. 96/1.5

*Primary Examiner*—David Klein
*Assistant Examiner*—John L. Goodrow
*Attorney, Agent, or Firm*—Arthur H. Rosenstein

[57] ABSTRACT

A class of organic pigments having the formula

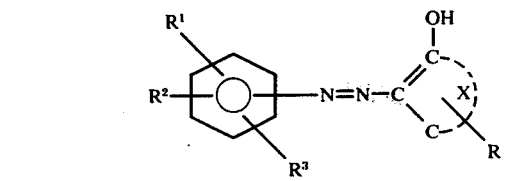

wherein X consists of the atoms necessary to complete a naphthalene, anthracene, or

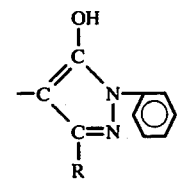

ring;

$R^1$, $R^2$, and $R^3$ are hydrogen, halogen, alkoxy, $NO_2$, alkyl, $SO_3H$ or alkali metal salts thereof,

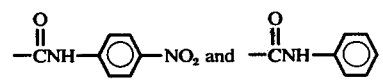

and COOH or alkali metal salts thereof, and $R^2$ and $R^3$ can comprise the atoms necessary to complete a phenyl, naphthyl or anthryl ring; and R is selected from the group consisting of

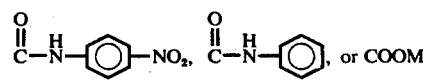

where M is alkyl, alkali or alkaline earth metal are useful as sensitizers for photoconductive compositions in electrophotographic processes.

23 Claims, No Drawings

ORGANIC AZO PIGMENT SENSITIZERS FOR PHOTOCONDUCTIVE LAYERS

The process of xerography, as disclosed by Carlson in U.S. Pat. No. 2,297,691, employs an electrophotographic element comprising a support material bearing a coating of a normally insulating material whose electrical resistance varies with the amount of incident actinic radiation it receives during an imagewise exposure. The element, commonly termed a photoconductive element, is first given a uniform surface adaptation. It is then exposed to a pattern of actinic radiation which has the effect of differentially reducing the potential of the surface charge in accordance with the relative energy contained in various parts of the radiation pattern. The differential surface charge of electrostatic latent image remaining on the electrophotographic element is then made visible by contacting the surface with a suitable electroscopic marking material. Such marking material or toner, whether contained in an insulating liquid or on a dry carrier, can be deposited on the exposed surface in accordance with either the charge pattern or the absence of charge pattern as desired. The deposited marking material may then be either permanently fixed to the surface of the sensitive element by known means such as heat, pressure, solvent vapor, or the like, or transferred to a second element to which it may similarly be fixed. Likewise, the electrostatic latent image can be transferred to a second element and developed there.

Various photoconductive insulating materials have been employed in the manufacture of electrophotographic elements. For example, vapors of selenium and vapors of selenium alloys deposited on a suitable support and particles of photoconductive zinc oxide held in a resinous, film-forming binder have found wide application in present-day document copying applications.

Since the introduction of electrophotography, a great many organic compounds have also been screened for their photoconductive properties. As a result, a very large number of organic compounds are known to possess some degree of photoconductivity. Many organic compounds have revealed a useful level of photoconduction and have been incorporated into photoconductive compositions. Optically clear organic photoconductor containing elements having desirable electrophotographic properties can be especially useful in electrophotography. Such electrophotographic elements may be exposed through a transparent base if desired, thereby providing unusual flexibility in equipment design. Such compositions, when coated as a film or layer on a suitable support also yield an element which is reusable; that is, it can be used to form subsequent images after residual toner from prior images has been removed by transfer and/or cleaning.

Although some of the photoconductors comprising the materials described are inherently light-sensitive, their degree of sensitivity is usually low and in the short wavelength portion of the spectrum so that it is common practice to add materials to increase the speed and to shift the sensitivity toward the longer wavelength portion of the visible spectrum. Increasing the speed and shifting the sensitivity of such systems into the visible region of the spectrum has several advantages: it makes available inexpensive and convenient light sources such as incandescent lamps; it reduces exposure time; it makes possible the recording of a wide range of colors in proper tonal relationship, and allows projection printing through various optical systems. By increasing the speed through the use of sensitizers, photoconductors which would otherwise have been unsatisfactory are useful in processes where high speeds are required such as document copying.

Various pigment particles are described in the prior art as useful photoconductors. The use of substituted 2,4-diaminotriazines as electrically photosensitive particles in photoelectrophoretic imaging and in conventional xerographic processes is described in U.S. Pat. No. 3,445,227. U.S. Pat. Nos. 3,447,922 and 3,448,028 describe the use of N-substituted-3,13-dioxodinaphtho(2,1-b',2',3'-d)-furan-6-carboxamides as photosensitive particles in xerographic processes. These photoconductors in themselves are not sensitive at the longer wavelength portion of the visible spectrum.

A large number of acidic compounds have been described as sensitizers for photoconductive compositions such as in U.S. Pat. No. 3,316,087 and French Pat. No. 1,288,392. The search for materials which enhance the sensitization of a broad range of photoconductors is a continuing one.

It is, therefore, an object of this invention to provide novel sensitized photoconductive compositions.

It is another object of this invention to provide novel sensitized photoconductive elements.

It is a further object of this invention to provide a process for using novel sensitized photoconductive elements.

These and other objects are accomplished with photoconductive compositions containing a photoconductor and a sensitizing amount of a specific class of organic pigments. Electrically insulating polymeric binders are generally added with non-polymeric photoconductors.

The organic pigment sensitizers of this invention have the formula:

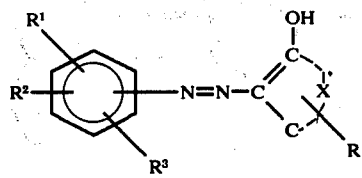

wherein:

X consists of the atoms necessary to complete a naphthalene, anthracene or

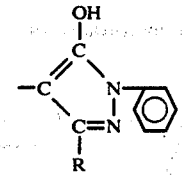

$R^1$, $R^2$, and $R^3$ are independently selected from the group consisting of hydrogen, halogen, such as chlorine, bromine, fluorine or iodine, alkoxy, preferably containing 1 to 8 carbon atoms such as methoxy, ethoxy, propoxy, and the like, including substituted alkoxy such as aminoalkoxy, haloalkoxy, and the like; $NO_2$, alkyl, preferably containing from 1 to 8 carbon atoms such as methyl, ethyl, propyl, butyl, isopentyl, hexyl and the like; SO$_3$H or alkali metal salts thereof such as SO$_3$Na, SO$_3$K, and the like; and COOH or alkali metal salts thereof such as COONa, COOK, and the like

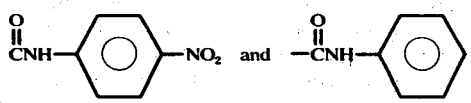

R$^2$ and R$^3$ can, taken together, also comprise the atoms necessary to complete a phenyl, naphthyl, or anthryl ring.

R is selected from the group consisting of

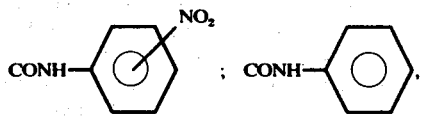

or COOm wherein M is alkyl preferably containing from 1 to 8 carbon atoms such as methyl, ethyl, isopropyl, butyl, hexyl, octyl, and the like; alkali metals such as Li, Na, K, Rb and Cs; and alkaline earth metals such as Ca, Sr, Ba, and the like.

It is noted that the term alkyl used throughout the specification and claims is meant to include substituted alkyl such as chloroalkyl, aralkyl, and the like. Generally, any substituent may be used on the alkyl that does not adversely affect the sensitizing properties of the pigment.

Some preferred pigment sensitizers of this invention are

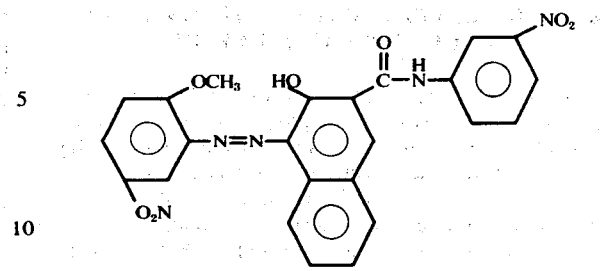

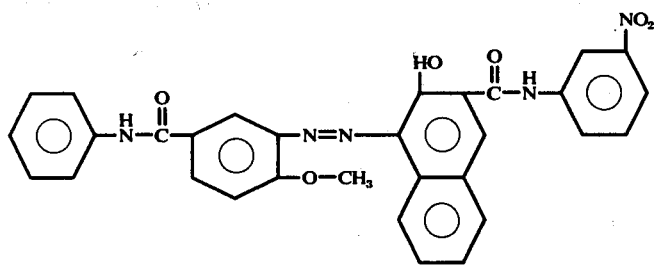

(Pigment Violet RB manufactured by Roma Chemicals)

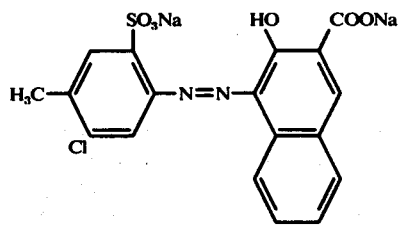

(Harrison Red pigment manufactured by Harmon Colors)

The above organic pigments produce an enhanced sensitization effect when used in a photoconductive composition containing photoconductors in comparison to the sensitization of (A) photoconductor compositions without the sensitizers, (B) photoconductive compositions containing only the pigments without an independent photoconductor, and (C) photoconductive compositions containing a photoconductor and similar pigments outside the scope of this invention. The enhanced sensitization is evidenced by greater electrical speeds. A suitable method of increasing electrical speed is described more fully in the appended examples.

Preferred binders for use in preparing the present photoconductive layers comprise polymers having fairly high dielectric strength which are good electrically insulating film-forming vehicles. Materials of this type comprise styrene-butadiene copolymers; silicon resins; styrene-alkyd resins; silicon-alkyd resins; soyaalkyd resins; poly(vinyl chloride); poly(vinylidene chloride); vinylidene chloride-acrylonitrile copolymers; poly(vinyl acetate); vinyl acetate-vinyl chloride copolymers; poly(vinyl acetals), such as poly(vinyl butyral); polyacrylic and methacrylic esters, such as poly(methylmethacrylate), poly(n-butylmethacrylate), poly(isobutylmethacrylate), etc. polystyrene, nitrated polystyrene; polymethylstyrene, isobutylene polymers; polyesters, such as poly(ethylenealkaryloxyalkylene terephthalate), phenol-formaldehyde resins; ketone resins; polyamides, polycarbonates; polythiocarbonates, poly(ethyleneglycol-co-bishydroxyethoxyphenyl propane terephthalate); etc. Methods of making resins of this type have been described in U.S. Pat. Nos. 2,361,019 and 2,258,423. Suitable resins of the type contemplated for use in the photoconductive layers of the invention are sold under such trade names as Vitel PE-101, Cymac, Piccopale 100, Saran F-200 and Lexan 105. Other types of binders which can be used in the photoconductive layers of the invention include such materials as paraffin, mineral waxes, etc. The binders are generally used with the inorganic photoconductors.

The sensitizers of this invention improve the electrical speeds of compositions containing a wide variety of photoconductors including inorganic photoconductors such as selenium, zinc oxide, titanium oxide, cadmium sulfide, lead oxide, cadmium selenide and the like and organic photoconductors including organometallic photoconductors.

Typical photoconductors useful herein are described below.

A. Arylamine photoconductors including substituted and unsubstituted arylamines, diarylamines, nonpolymeric triarylamines and polymeric triarylamines such as those described in U.S. Patent Nos. 3,240,597 and 3,180,730.

B. Photoconductors represented by the formula:

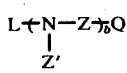

wherein Z represents a mononuclear or polynuclar divalent aromatic radical, either fused or linear (e.g., phenyl, naphthyl, biphenyl, binaphthyl, etc), or a substituted divalent aromatic radical of these types wherein said substituent can comprise a member such as an acyl group having from 1 to about 6 carbon atoms (e.g., acetyl, propionyl, butyryl, etc), an alkyl group having from 1 to about 6 carbon atoms (e.g., methyl, ethyl, propyl, butyl, etc), an alkoxy group having from 1 to about 6 carbon atoms (e.g., methoxy, ethoxy, propoxy, pentoxy, etc), or a nitro group; Z' represents a mononuclear or polynuclear monovalent or polynuclear monovalent aromatic radical, either fused or linear (e.g., phenyl, naphthyl, biphenyl, etc); or a substituted monovalent aromatic radical wherein said substituent can comprise a member such as an acyl group having from 1 to about 6 carbon atoms (e.g., acetyl, propionyl, butyryl, etc), an alkyl group having from 1 to about 6 carbon atoms (e.g., methyl, ethyl, propyl, butyl, etc), an alkoxy group having from 1 to about 6 carbon atoms (e.g., methoxy, propoxy, pentoxy, etc), or a nitro group; Q can represent a hydrogen atom or an aromatic amino group, such as Z'NH—; $b$ represents an integer from 1 to about 12, and L represents a hydrogen atom, a mononuclear or polynuclear aromatic radical either fused or linear (e.g., phenyl, naphthyl biphenyl, etc), a substituted aromatic radical wherein said substituent comprises an alkyl group, an alkoxy group, an acyl group, or a nitro group, or a poly(4'-vinylphenyl) group which is bonded to the nitrogen atom by a carbon atom of the phenyl group, these materials being more fully described in U.S. Pat. No. 3,265,496.

C. Polyarylalkane photoconductors including leuco bases of diaryl or triarylmethane dye salts, 1,1,1-triarylalkanes wherein the alkane moiety has at least two carbon atoms and tetraarylmethanes having an amino group substituted in at least one of the aryl nuclei attached to the alkane and methane moieties of the latter two classes of photoconductors which are nonleuco base materials; and also other polyarylalkanes included by the formula:

wherein each of D, E and G is an aryl group and J is a hydrogen atom, an alkyl group, or an aryl group, at least one of D, E and G containing an amino substituent, the aryl groups attached to the central carbon atom being preferably phenyl groups, although naphthyl groups can also be used including substituted aryl groups containing substituents such as alkyl and alkoxy typically having 1 to 8 carbon atoms, hydroxy, halogen, etc, in the ortho, meta or para positions, ortho-substituted phenyl being preferred; the aryl groups can also be joined together or cyclized to form a fluorene moiety, for example; the amino substituent can be represented by the formula:

wherein each R can be an alkyl group typically having 1 to 8 carbon atoms, a hydrogen atom, an aryl group, or together, the necessary atoms to form a heterocyclic amino group typically having 5 to 6 atoms in the ring such as morpholino, pyridyl, pyrryl, etc; at least one of D, E and G preferably being a p-dialkylaminophenyl group, when J is an alkyl group, such an alkyl group more generally has 1 to 7 carbon atoms, these materials being more fully described in U.S. Pat. No. 3,274,000, French Pat. No. 1,383,461 and in U.S. application Ser. No. 627,857, filed Apr. 3, 1967 by Seus and Goldman, now U.S. Pat. No. 3,542,544.

D. Photoconductors comprising 4-diarylamino-substituted chalcones having the formula:

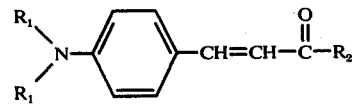

wherein:

$R_1$ and $R_2$ are each phenyl radicals including substituted phenyl radicals, $R_2$ preferably having the formula:

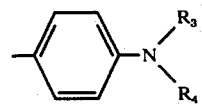

wherein:

$R_3$ and $R_4$ are each aryl radicals, aliphatic residues of 1 to 12 carbon atoms such as alkyl radicals preferably having 1 to 4 carbon atoms, or hydrogen; particularly advantageous results being obtained when $R_1$ is a phenyl radical including a substituted phenyl radical and where $R_2$ is diphenylaminophenyl, dimethylaminophenyl or phenyl, these materials being more fully described in Fox U.S. Pat. No. 3,526,501.

E. Non-ionic cycloheptenyl compounds which may be substituted with substituents such as (a) an aryl radical including substituted as well as unsubstituted aryl radicals, (b) a hydroxy radical, (c) a heterocyclic radical, (d) a heterocyclic radical having 5 to 6 atoms in the heterocyclic nucleus and at least one hetero nitrogen atom, and including substituted and unsubstituted heterocyclic radicals, and (e) an oxygen linked cycloheptenyl moiety. The substitution on the cycloheptenyl nucleus occurs at an unsaturated carbon atom when the cycloheptenyl moiety is a conjugated triene with no aromatic structure fused thereto. However, if there is at least one aromatic structure fused to the cycloheptenyl moiety, then the substituents are attached to a saturated carbon atom. Additional photoconductors within this class are included in one of the following formulae:

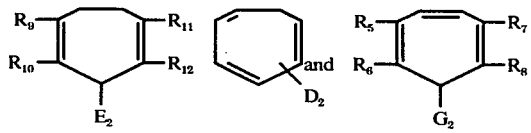

where $E_2$ and $G_2$ can be either:
 a. a phenyl radical,
 b. a naphthyl radical,
 c. a heterocyclic radical having 5 to 6 atoms in the heterocyclic nucleus and at least 1 hetero nitrogen atom,
 d. a hydroxyl radical, or
 e. an oxygen-containing radical having a structure such that the resultant cycloheptenyl compound is a symmetrical ether;

$D_2$ can be any of the substituents defined for $E_2$ and $G_2$ above and is attached to a carbon atom in the cycloheptenyl nucleus having a double bond; ($R_9$ and $R_{10}$), ($R_{11}$ and $R_{12}$), ($R_5$ and $R_6$), and ($R_7$ and $R_8$) are together the necessary atoms to complete a benzene ring fused to the cycloheptenyl nucleus; these compounds being more fully described in U.S. application Ser. No. 654,091, filed July 18, 1967.

F. Compounds containing an

nucleus including (1) unsubstituted and substituted N,N-bicarbazyls N-bicarbazyls containing substituents in either or both carbazolyl nuclei such as:
 a. an alkyl radical including a substituted alkyl radical such as a haloalkyl or an alkoxyalkyl radical,
 b. a phenyl radical including a substituted phenyl radical such as a naphthyl, an aminophenyl or a hydroxyphenyl radical,
 c. a halogen atom,
 d. an amino radical including substituted as well as unsubstituted amino radicals such as an alkylamino or a phenylalkylamino radical,
 e. an alkoxy radical,
 f. a hydroxyl radical,
 g. a cyano radical,
 h. a heterocyclic radical such as a pyrazolyl, a carbazolyl or a pyridyl radical;
or (2) tetra-substituted hydrazines containing substituents which are substituted or unsubstituted phenyl radicals, or heterocyclic radicals having 5 to 6 atoms in the hetero nucleus, suitable results being obtained when all four substituents are not unsubstituted phenyl radicals, i.e., if at least one substituent is a substituted phenyl radical or a heterocyclic radical having 5 to 6 atoms in the hetero nucleus. Other tetrasubstituted hydrazines include those having the following formula:

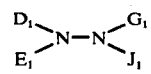

wherein $D_1$, $E_1$, $G_1$ and $J_1$ are each either
 a. a substituted phenyl radical such as a naphthyl radical, an alkylphenyl radical, a halophenyl radical, a hydroxyphenyl radical, a haloalkylphenyl radical or a hydroxyalkylphenyl radical or
 b. a heterocyclic radical such as an imidazolyl radical, a furyl radical or a pyrazolyl radical.

In addition, $J_1$ and $E_1$ can also be
 c. an unsubstituted phenyl radical.

Especially preferred are those tetra-substituted hydrazines wherein both $D_1$ and $G_1$ are either substituted phenyl radicals or heterocyclic radicals. These compounds are more fully described in U.S. Pat. No. 3,542,546.

G. Organic compounds having a 3,3'-bisaryl-2-pyrazoline nucleus which is substituted in either five-member ring with the same or different substituents. The 1 and 5 positions on both pyrazoline rings can be substituted by an aryl moiety including unsubstituted as well as substituted aryl substituents such as alkoxyaryl, alkaryl, alkaminoaryl, carboxyaryl, hydroxyaryl and haloaryl. The 4-position can contain hydrogen or unsubstituted as well as substituted alkyl and aryl radicals such as alkoxyaryl, alkaryl, alkaminoaryl, haloaryl, hydroxyaryl, alkoxyalkyl, aminoalkyl, carboxyaryl, hydroxyalkyl and haloalkyl. Other photoconductors in this class are represented by the following structure:

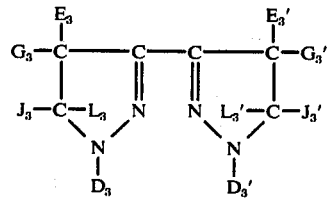

wherein:
 $D_3$, $D_3'$, $J_3$ and $J_3'$ can be either a phenyl radical including a substituted phenyl radical such as a tolyl radical or a naphthyl radical including a substituted naphthyl radical.

$E_3$, $E_3'$, $G_3$, $G_3'$, $L_3$ and $L_3'$ can be any of the substituents set forth above and in addition can be either a hydrogen atom or an alkyl radical containing 1 to 8 carbon atoms. These organic photoconductors are more fully described in U.S. Pat. No. 3,527,602.

H. Triarylamines such as those described in U.S. Pat. No. 3,180,730 and those in which at least one of the aryl radicals is substituted by an active hydrogen-containing group or a vinyl or vinylene radical having at least one active hydrogen-containing group. These materials are more fully described in U.S. Pat. No. 3,658,520, issued Apr. 25, 1972.

I. Organic-metallic compounds having at least one amino-aryl substituent attached to a Group IVa or Group Va metal atom such as silicon, germanium, tin and lead from Group IVa and phosphorus, arsenic, antimony and bismuth from Group Va. These materials can be substituted in the metallo nucleus with a wide variety of substituents but at least one of the substituents must be an amino-aryl radical. These materials are described in U.S. Pat. No. 3,647,429, issued Mar. 7, 1972.

J. Polymeric organic photoconductors such as poly-N-vinylcarbazoles and related vinyl polymers, such materials being disclosed for example, in U.S. Pat. Nos. 3,037,861; 3,155,503; 3,418,116; 3,421,891 and 3,232,755.

K. Any other organic compound which exhibits photoconductive properties such as those set forth in Australian Pat. No. 248,402.

Representative organic photoconductors useful in this invention include the compounds listed below:
   diphenylamine
   dinaphthylamine
   2,4,7-trinitrofluorenone
   N,N'-diphenylbenzidene
   N-phenyl-1-naphthylamine
   N-phenyl-2-naphthylamine
   N,N'-diphenyl-p-phenylenediamine
   2-carboxy-5-chloro-4'-methoxydiphenylamine
   p-anilinophenol
   N,N'-di-2-naphthyl-p-phenylenediamine
   4,4'-benzylidene-bis-(N,N-dimethyl-m-toluidine)
   triphenylamine
   N,N,N',N'-tetraphenyl-m-phenylenediamine
   4-acetyltriphenylamine
   4-hexanoyltriphenylamine
   4-lauroyltriphenylamine
   4-hexyltriphenylamine
   4-dodecyltriphenylamine
   4,4'-bis(diphenylamino)benzil
   4,4'-bis(diphenylamino)benzophenone
   poly[N,4''-(N,N',-triphenylbenzidine)]
   polyadipyltriphenylamine
   polysebacyltriphenylamine
   polydecamethylenetriphenylamine
   poly-N-(4-vinylphenyl)diphenylamine
   poly-N-(vinylphenyl)-α,α'-dinaphthylamine
   4,4'-benzylidene-bis(N,N-diethyl-m-toluidine)
   4,4''-diamino-4-dimethylamino-2',2''-dimethyltriphenylmethane
   4',4''-bis(diethylamino)-2,6-dichloro-2',2''-dimethyltriphenylmethane
   4',4''-bis(diethylamino)-2',2''-dimethyldiphenylnaphthylmethane
   4'',4''-bis(dimethylamino-2-chloro-2',2'',4',4''-bis-(diethylamino)-2-chloro-2',2''-dimethyl-4-dimethylaminotriphenylmethane
   4',4''-bis(diethylamino)-4-dimethylamino-2,2',2''-trimethyltriphenylmethane
   4',4''-bis(dimethylamino)-2-chloro-2',2''-dimethyltriphenylmethane
   4',4''-bis(dimethylamino)-2',2''-dimethyl-4-methoxytriphenylmethane
   bis(4-diethylamino)-1,1,1-triphenylethane
   bis(4-diethylamino)tetraphenylmethane
   4',4''-bis(benzylethylamino)-2',2''-dimethyltriphenylmethane
   4',4''-bis(diethylamino)-2',2''-diethoxytriphenylmethane
   4,4'-bis(dimethylamino)-1,1,1-triphenylethane
   1-(4-N,N-dimethylaminophenyl-1,1-diphenylethane
   4-dimethylaminotetraphenylmethane
   4-diethylaminoetraphenylmethane
   4,4'-bis(diphenylamino)chalcone
   4-diphenylamino-4'-dimethylaminochalcone
   4-diphenylamino-4'-diphenylaminochalcone
   4,4'-bis(dimethylamino)chalcone
   4,4'-bis(diethylamino)chalcone
   4-diethylamine-4'-diphenylaminochalcone
   4-diphenylaminochalcone
   4-dimethylaminochalcone
   4'-diphenylaminochalcone
   4'-dimethylaminochalcone
   bis{5-(5H-dibenzo[a,d]cycloheptenyl)} ether
   5-hydroxy-5H-dibenzo[a,d]cycloheptene
   1-{5-(5H-dibenzo[a,d]cycloheptenyl)¹-4,5-dicarbomethoxy-1,2,3-triazole
   1-{5-(5H-dibenzo[a,d]cycloheptencyl)}-4,5-dibenzoyl-1,2,3-triazole
   5-azido-5H-dibenzo[a,d]cycloheptene
   1-{5-(10,11-dihydro-5H-dibenzo[a,d]cycloheptenyl)}-4,5-dicarbomethoxy-1,2,3-triazole
   1-{5-(10,11-dihydro-5H-dibenzo[a,d]cycloheptenyl)}-4,5-dibenzoyl-1,2,3-triazole
   4-{5-(5H-dibenzo[a,d]cycloheptenyl)}-N,N-dimethylaniline
   N,N-diethyl-3-methyl-4-{5-(5H-dibenzo[a,d]cycloheptenyl)}aniline
   4-{5-(5H-dibenzo[a,d]cycloheptenyl)}-1-dimethylaminonaphthalene
   N,N-diethyl-3-methyl-4-{5-(10,11-dihydro-5H-dibenzo[a,d]cycloheptenyl)}aniline
   3-(4-dimethylaminophenyl)-1,3,5-cycloheptatriene
   3-(4-diethylamino-2-methylphenyl)-1,3,5-cycloheptatriene
   3-(4-dimethylaminonaphthyl)-1,3,5-cycloheptatriene
   N,N-diethyl-3-methyl-4-{5-(5H-dibenzo[a,d]cycloheptenyl)} aniline
   tetra-α-naphthylhydrazine
   tetra(3-methyl-4-hydroxyphenyl)hydrazine
   tetra(m-hydroxyethylphenyl)hydrazine
   tetra(2-methyl-5-chloroethylphenyl)hydrazine
   tetra(2-methyl-5-hydroxyphenyl)hydrazine
   tetra(1-imidazolyl)hydrazine
   N,N-di-α-naphthyl-N',N'-di(3-methyl-4-hydroxyphenyl)hydrazine
   N-3-furyl-N-(2-methyl-4-hydroxyphenyl)-N',N'-di-β-naphthylhydrazine
   tetra-β-naphthylhydrazine
   N,N'-di-β-naphthyl-N,N'-diphenylhydrazine tetra-4-tolylhydrazine
   N,N'-diphenyl-N,N'-di(3-methyl-4-hydroxyphenyl)hydrazine
   N,N'-adiphenyl-N,N'-di-p-chlorophenylhydrazine
   phenyltri(2-methyl-5-hydroxyphenyl)hydrazine
   N,N'-bicarbazyl
   cyclotetrakis(3,9-carbazolylene)
   6-(3-carbazolyl)-cyclotetrakis(3,9-carbazolylene)
   6-(9-carbazolyl)-cyclotetrakis(3,9-carbazolylene)
   3,3'-bis(3-carbazolyl-9,8'-bicarbazolyl
   poly(N-vinyl-9 carbazole)
   monobromo-poly(N-vinyl-9 carbazole)
   3-(3-carbazolyl)-9-(9-carbazolyl)carbazole
   3-(9-carbazolyl)-9,9'-bicarbazolyl
   3,3'-diethyl-9,9'-bicarbazolyl
   3,3'-diphenyl-9,9'-bicarbazolyl
   3,3'-dichloro-9,9'-bicarbazolyl
   4,4'-bis(diethylamino)-9,9'-bicarbazolyl
   3,3'-diethoxy-9,9'-bicarbazolyl 1,1'-dihydroxy-9,9'-bicarbazolyl
2,2'-dicyano-9,9'-bicarbazolyltetra(p-diethylaminophenyl)hydrazine(p-diethylaminophenyl)hydrazine
3,3'-bis(1,5-diphenyl-2-pyrazoline)
3,3'-bis-(1-p-tolyl-5-phenyl-2-pyrazoline)
3,3'-bis(1,5-[1-naphthyl]-2-pyrazoline)
1,5-diphenyl-3-[3'-(1'-p-tolyl-5-phenyl)-2'-pyrazolyl]-2-pyrazoline
3,3'-bis(1,5-diphenyl-4,5-dimethyl-2-pyrazoline)
3,3'-bis(1,4,5-triphenyl-2-pyrazoline
3,3'-bis(1,5-di-p-tolyl-4-methoxy-2-pyrazoline)
3,3'-bis(1,5-diphenyl-4-dimethylamino-2-pyrazoline)
3,3'-bis[1,5-diphenyl-4-(p-chlorophenyl)-2-pyrazoline]
3,3'-bis[1,5-diphenyl-4,5-di(p-diethylaminophenyl)-2-pyrazoline]
3,3'-bis[1,5-diphenyl-4,5-di(p-diethylaminophenyl)-2-pyrazoline]
3,3'-bis[1,5-diphenyl-4-(p-methoxyphenyl)-5-ethyl-2-pyrazoline]
3,3'-bis(1,5-diphenyl-4-chloromethyl-2-pyrazoline)
1,5-diphenyl-4,5-dimethyl-3-[3'-(1'-p-tolyl-4'-diethyl-5',5'-methylphenyl)-2'-pyrazolyl]-2-pyrazoline
4-(p-diphenylaminophenyl)-3-buten-1-yne
p-diphenylaminostyrene
ethyl-p-diphenylaminocinnamate
methyl-p-diphenylaminocinnamate
p-diphenylaminocinnamoyl chloride
p-diphenylaminocinnamic acid, N,N-diphenylamide
p-diphenylaminocinnamic acid anhydride
3-(p-diphenylaminophenyl)-2-butenoic acid
bis(p-diphenylaminobenzal)succinic acid
4-N,N-bis(p-bromophenyl)aminocinnamic acid
1-(4-diphenylamino)naphthacrylic acid
p-diphenylaminocinnamic acid
p-diphenylaminocinnamonitrile
7-diphenylamino coumarin
p-diphenylaminophenylvinylacrylic acid
p-diphenylaminobenzyl-p'-diphenylaminocinnamate
7-(p-diphenylaminostyryl)coumarin
p-diphenylaminocinnamyl alcohol
4-diphenylaminocinnamaldehyde semicarbazone
O-p-diphenylaminocinnamoyl
p'-diphenylaminobenzaldehyde oxime
p-diphenylamino cinnamaldehyde oxime
1,3-bis(p-diphenylaminophenyl)-2-propen-1-ol
methyl-p-diphenylaminobenzoate
N,N-diphenylanthranilic acid
3-p-diphenylaminophenyl-1-1-propanol
4-acetyltriphenylamine semicarbazone ethyl-2,6-diphenyl-4-(p-diphenylaminophenyl)benzoate
1-(p-diphenylaminophenyl)-1-hydroxy-3-butyne
4-hydroxymethyltriphenylamine
1-(p-diphenylaminophenyl)ethanol
4-hydroxytriphenylamine
2-hydroxytriphenylamine
4-formyltriphenylamine oxime
4-acetyltriphenylamine oxime
1-(p-diphenylaminophenyl)hexanol
1-(p-diphenylaminophenyl)dodecanol
p-diphenylaminobenzoic acid anhydride
4-cyanotriphenylamine
p-diphenylaminobenzoic acid, N,N-diphenylamide
p-diphenylaminobenzoic acid
p-diphenylaminobenzoyl chloride
3-p-diphenylaminophenylpropionic acid 4-formyltriphenylamine semicarbazone
triphenyl-p-diethylaminophenylsilane
methyl-diphenyl-p-diethylaminophenylsilane
triphenyl-p-diethylaminophenylgermane
triphenyl-p-dimethylaminophenylstannane
triphenyl-p-diethylaminophenylstannane
diphenyl-di-(p-diethylaminophenyl)stannane
triphenyl-p-diethylaminophenylplumbane
tetra-p-diethylaminophenylblumbane
phenyl-di-(p-diethylaminophenyl)phosphine
bis(p-diethylaminophenyl)phosphine oxide
tri-p-dimethylaminophenylarsine
tri-p-diethylaminophenylarsine
2-methyl-4-dimethylaminophenylarsine oxide
tri-p-diethylaminophenylbismuthine
methyl-di-(p-diethylaminophenyl)arsine
methyl-di-(p-diethylaminophenyl)phosphine
phenyl-tri-(p-diethylaminophenyl)stannane
methyl-tri-(p-diethylaminophenyl)stannane
tetra-p-diethylaminophenylgermane
diphenyl-p-diethylaminophenylsilane
p-diethylaminophenylarsine
tetrakis-[diphenyl-(p-diethylaminophenyl)plumbyl]methane
tetrakis-[diphenyl-)p-diethylaminophenyl)stannyl]stannane
bis[phenyl-(p-diethylaminophenyl)]dibismuthine
tri-(p-diethylaminophenyl)phosphine sulfide
di(p-diethylaminophenyl)thioxotin
4-(di-p-tolylamino)-2'-(di-p-tolylamino)styryl]stilbene
4-(di-p-tolylamino)-2',4'-dimethyl-5'-[4-(di-p-tolyl)styryl]stilbene
and combinations of the above.

In preparing the coating composition useful results are obtained where the photoconductor substance is present in an amount equal to at least about 1 weight percent of the coating composition. The upper limit in the amount of photoconductor substance present can be widely varied in accordance with usual practice. In those cases where binder is employed, it is normally required that the photoconductor substance be present in an amount from about 1 weight percent of the coating composition to about 99 weight percent of the coating composition. A preferred weight range for the photoconductor substance in the coating composition is from about 10 weight percent to about 60 weight percent.

The amount of sensitizer that can be added to a photoconductor-incorporating layer to give effective increases in speed can vary widely. The optimum concentration in any given case will vary with the specific photoconductor and sensitizing compound used. In general, substantial speed gains can be obtained where an appropriate sensitizer is added in a concentration range from about 0.0001 to about 30 percent by weight of the film-forming coating composition. Normally, a sensitizer is added to the coating composition in an amount from about 0.005 to about 5.0 percent by weight of the total coating composition.

Various addenda that can be added to the photoconductive compositions are plasticizers, coating aides (leveling agents) and abrasion resistant materials such as silicones, etc.

Electrophotographic elements of the invention can be prepared with any photoconductive compound and the sensitizers of this invention in the usual manner, i.e., by blending a dispersion or solution of the photoconductive compound together with a binder, when desirable, and coating or forming a self-supporting layer with the photoconductive composition. Generally, a suitable amount of the sensitizing compound is mixed with the photoconductive coating composition so that, after thorough mixing, the sensitizing compound is uniformly distributed throughout the desired layer of the coated element.

Solvents of choice for preparing coating compositions of the present invention can include a number of solvents such as benzene, toluene, acetone, butanone, chlorinated hydrocarbons, e.g., methylene chloride, ethylene chloride, etc, ethers, e.g., tetrahydrofuran, or mixtures of these solvents, etc.

Coating thicknesses of the photoconductive composition on a support can vary widely. Normally, coating in the range of about 0.001 inch to about 0.01 inch before drying is useful for the practice of this invention. The preferred range of coating thickness is found to be in the range from about 0.002 inch to about 0.006 inch before drying although useful results can be obtained outside this range.

Suitable supporting materials for coating the photoconductive layers of the present invention can include any of a wide variety of electrically conducting supports, for example, paper (at a relative humidity about 20 percent); aluminum-paper laminates; metal foils such as aluminum foil, zinc foil, etc; metal plates, such as aluminum, copper, zinc, brass, and galvanized plates; vapor deposited metal layers such as silver, nickel or aluminum on conventional film supports such as cellulose acetate, poly(ethylene terephthalate), polystyrene and the like conducting supports. An especially useful conducting support can be prepared by coating a support material such as poly(ethylene terephthalate) with a layer containing a semiconductor dispersed in a resin. Such conducting layers both with and without insulating barrier layers are described in U.S. Pat. No. 3,245,833. Likewise, suitable conducting coating can be prepared from the sodium salt of a carboxyester lactone of a maleic anhydridevinyl acetate copolymer. Such kinds of conducting layers and methods for their optimum preparation and use are disclosed in U.S. Pat. Nos. 3,007,901, 3,245,833 and 3,267,807.

The elements of the present invention can be employed in any of the well known electrophotographic processes which require photoconductive layers. One such process is the aforementioned xerographic process. As explained previously, in a process of this type the electrophotographic element is given a blanket electrostatic charge by placing the same under a corona discharge which serves to give uniform charge to the surface of the photoconductive layer. This charge is retained by the layer owing to the substantial insulating property of the layer. The electrostatic charge formed on the surface of the photoconducting layer is then selectively dissipated from the surface of the layer by exposure to light through an imagebearing transparency by a conventional exposure operation such as, for example, by contact-printing technique, or by lens projection of an image, etc, to form a latent image in the photoconducting layer. By exposure of the surface in this manner, a charge pattern is created by virtue of the fact that light causes the charge to be conducted away in proportion to the intensity of the illumination in a particular area. The charge pattern remaining after exposure is then developed, i.e., rendered visible, by treatment with a medium comprising electrostatically attractable particles having optical density. The developing electrostatically attractable particles can be in the form of a dust e.g., powder, a pigment in a resinous carrier, i.e., toner, or a liquid developer may be used in which the developing particles are carried in an electrically insulating liquid carrier. Methods of development of this type are widely known and have been described in the patent literature in such patents, for example, as U.S. Pat. No. 2,297,691, and in Australian Pat. No. 212,315. In processes of electrophotographic reproduction such as in xerography, by selecting a developing particle which has as one of its components, a low-melting resin it is possible to treat the developed photoconductive material with heat and cause the powder to adhere permanently to the surface of the photoconductive layer. The heating is generally carried out in a temperature range of from about 25° C. to about 150° C. The preferred range is from about 100° C to about 135° C.

The present invention is not limited to any particular mode of use of the new electrophotographic materials, and the exposure technique, the charging method, the transfer (if any), the developing method, and the fixing method as well as the material used in these methods can be selected and adapted to the requirements of any particular technique.

Electrophotographic materials according to the present invention can be applied to reproduction techniques wherein different kinds of radiation, i.e., electromagnetic radiations as well as nuclear radiations can be used. For this reason, it is pointed out herein that although materials according to the invention are mainly intended for use in connection with methods comprising an exposure, the term "electrophotography" wherever appearing in the description and the claims, is to be interpreted broadly and understood to comprise both xerography and xeroradiography.

The invention is further illustrated by the following examples which include preferred embodiments thereof.

EXAMPLE 1

A formulation comprising a binder of poly(4,4'-isopropylidenebisphenoxyethyl-co-ethylene terephthalate) (Vitel PE 101 manufactured by Goodyear Tire & Rubber Co.) and 20 percent by weight of 2,4,7-trinitro-9-fluorenone (TNF) photoconductor and 1 percent by weight of Diane Blue pigment having the formula:

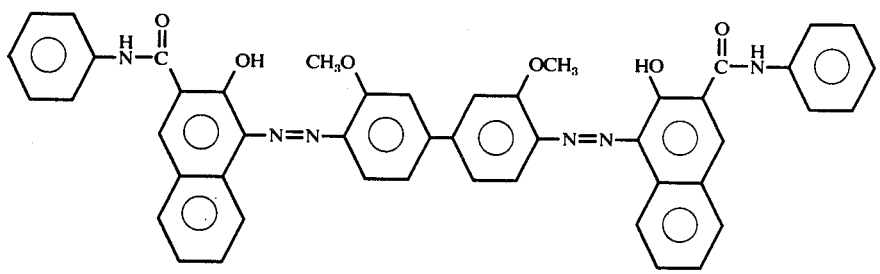

was coated at 0.004 inch wet thickness over a poly(ethylene terephthalate) film support which was coated with a 0.4 ND conductive nickel layer. The pigment was milled in the composition in a shaker with steel balls for a period of ¼ hour to 4 hours.

The above sensitized element was compared to 5 control elements containing the same components wherein control A contains no sensitizer, control B contains 1 percent by weight of Indofast Yellow toner having the formula:

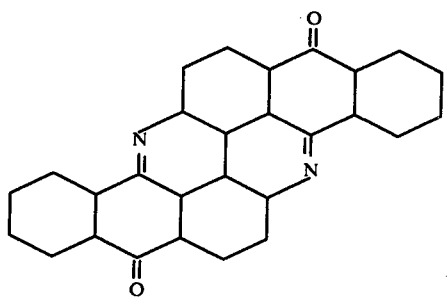

Control C contains 1 percent by weight of Selkirk Red pigment having the formula:

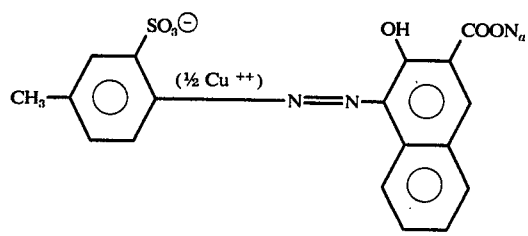

Control D contains 1 percent by weight Benzidine Yellow pigment having the formula:

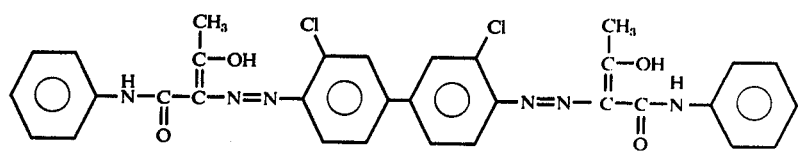

Control E contains 1 percent by weight Britione Red pigment having the formula:

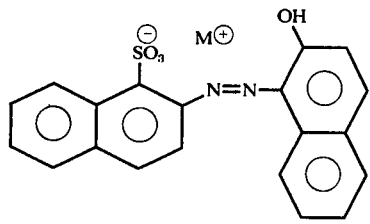

wherein M is a metal

In Examples 1–12 of the present application, Relative H & D Electric Speeds are reported. The relative H & D electrical speeds measure the speed of a given photoconductive material relative to other materials typically within the same test group of materials. The relative speed values are not absolute speed values. However, relative speed values are related to absolute speed values. The relative electrical speed (shoulder or toe speed) is obtained simply by arbitrarily assigning a value, Ro, to one particular absolute shoulder or toe speed of one particular photoconductive material. The relative shoulder or toe speed, Rn, of any other photoconductive material, $n$, relative to this value, Ro, may then be calculated as follows: Rn = (An) (Ro/Ao) wherein An is the absolute electrical speed of material n, Ro is the speed value arbitrarily assigned to the first material, and Ao is the absolute electrical speed of the first material. The absolute H & D electrical speed, either the shoulder (SH) or toe speed, of a material may be determined as follows. The material is electrostatically charged under, for example, a corona source until the surface potential, as measured by an electrometer probe, reaches some suitable initial value $V_o$, typically about 600 volts. The charged element is then exposed to a 3000° K tungsten light source through a stepped density gray scale. The exposure causes reduction of the surface potential of the element under each step of the gray scale from its initial potential $V_o$ to some lower potential V the exact value of which depends upon the amount of exposure in meter-candle-seconds received by the area. The results of these measurements are then plotted on a graph of surface potential V vs, log exposure for each step, thereby forming an electrical characteristic curve. The electrical or electrophotographic speed of the photoconductive composition can then be expressed in terms of the reciprocal of the exposure required to reduce the surface potential of any fixed selected value. The actual positive or negative shoulder speed is the numerical expression of $10^4$ divided by the exposure in meter-candle-seconds required to reduce the initial surface potential $V_o$ to some value equal to $V_o$ minus 100. This is referred to as the 100 volt shoulder speed. Sometimes it is desirable to determine the 50 volt shoulder speed and, in that instance, the exposure used is that required to reduce the surface potential to $V_o$ minus 50. Similarly, the actual positive or negative toe speed is the numerical expression of $10^4$ divided by the exposure in meter-candle-seconds required to reduce the initial potential $V_o$ to an absolute value of 100 volts. Again, if one wishes to determine the 50 volt toe speed, one merely uses the exposure required to reduce $V_o$ to an absolute value of 50 volts. An apparatus useful for determining the electrophotographic speeds of photoconductive compositions is described in Robinson et al., U.S. Pat. No. 3,449,658 issued June 10, 1969. The relative speeds obtained for the various elements tested are given in Table 1 below.

Table 1

| Example | λ max (nm) | Relative Electrical H & D Speed (sh/100 V Toe) | |
|---|---|---|---|
| 1 | 635 | *100/3.2 | *100/3.3 |
| Control A | — | 2.0/0 | 4.2/0 |
| Control B | 445 | 11/1.0 | 20.8/1.3 |
| Control C | 570 | 20/.6 | 30/1 |
| Control D | 450 | 20/1.2 | 24.2/1.6 |
| Control E | 565 | 16/1.2 | 19.2/1.7 |

*assigned an arbitrary speed value of 100.

The speed of the element containing Diane Blue pigment was unexpectedly superior to that containing no pigment and those containing other similar pigments.

EXAMPLE 2

A formulation comprising a binder of Vitel PE 101, 20 percent by weight of 4,4°-diethylamino-2,2'-dimethyltriphenylmethane photoconductor and varying amounts of Diane Blue pigment was coated at 4 ml. thickness of a poly(ethylene terephthalate) support which was coated with a 0.4 ND conductive nickel layer. The Relative H and D speeds of the elements are shown in Table 2.

Table 2

| Percent Pigment | Relative Electrical H&D Speeds (sh/100 V Toe) | |
|---|---|---|
| 0.5 | *100/<.5 | *100/2 |
| 1.0 | 240/5 | 157.5/10 |
| 2.0 | 220/12.6 | 300/9 |
| 4.0 | 500/32 | 300/10 |

*assigned an arbitrary speed value of 100.

EXAMPLE 3

A series of composition containing 20% by weight of the photoconductor of Example 2, 4% by weight Diane Blue pigment and various binders were coated as in Example 2. The relative electrical H & D speeds of these elements are shown in Table 3.

Table 3

| Binder | Relative Electrical H & D Speeds (sh/100 V Toe) | |
|---|---|---|
| Poly(4,4'-isopropylidene bis phenoxy ethyl-co-ethylene terephthalate) (Vitel mfg. by Goodyear Tire & Rubber Co.) | *100/7.4 | *100/3.2 |
| Bisphenol A poly- | | |
| carbonate (Lexan 145 mfg. by General Electric Co.) | 115/3.3 | 54/6.3 |
| Chlorinated polyethylene (62.5% chlorine) | 10.5/1.7 | 14/5.0 |
| Polystyrene | 8.4/1.3 | 17/.3 |
| Poly(vinyl-n-bromo-benzoate-vinyl acetate) | 16.8/0.6 | 11/<.3 |
| Poly(vinyl chloride-vinylidene chloride) | 28.4/3.8 | 23/.6 |
| Methyl methacrylate | 52.6/1.1 | 180/1.0 |
| Poly(vinyl chloride-vinyl acetate) | 189/18.9 | 70/6.3 |

*assigned an arbitrary speed value of 100.

EXAMPLE 4

Photoconductive elements comprising Diane Blue pigment and poly(N-vinyl-9-carbazole) and monobromo-poly(N-vinyl-9-carbazole) as photoconductors have relative electrical H & D speeds as shown in Table 4.

Table 4

| Photoconductor | % Diane Blue | Relative Electrical H & D Speeds (sh/100 V toe) | |
|---|---|---|---|
| Poly(N-vinyl-9-carbazole) | 1 | *100/1.8 | *100/3.8 |
| Monobromo poly(N-vinyl-9-carbazole) | 1 | 177/6.9 | 239/6.4 |
| Poly(N-vinyl-9-carbazole) | 0.25 | 8.1/0 | 4.8/0 |
| Monobromo poly(N-vinyl-9-carbazole | 0.25 | 92.2/.5 | 114/.7 |

*assigned an arbitrary speed value of 100.

EXAMPLE 5

A series of compositions containing Vitel PE101 binder, 20% by weight of various organic photoconductors and 4% by weight of photoconductor and binder of Diane Blue pigment in methylene chloride solvent was prepared. The compositions were coated onto conductive supports and tested as in Example 1. Table 5 shows the relative electrical speeds obtained.

Table 5

| Photoconductor | Relative Electrical H & D Speeds (sh/100 V Toe) | |
|---|---|---|
| Triphenylamine | *100/3.3 | *100/0 |
| Tri-p-tolylamine | 66.7/9.6 | 100/3 |
| Bis(4-diethylamino)-tetraphenylmethane | 104/8.3 | 66.7/2.7 |
| Phenyl-bis(4-diethylaminophenylgermane) | 116.7/8.3 | 91.7/2 |

*assigned an arbitrary speed value of 100.

EXAMPLE 6

A series of compositions containing Vitel 101 binder, 20% by weight of various photoconductors and in Example 6, 4% Diane Blue pigment, in Control A, 0.8% 2,6-bis(4-ethylphenyl)-4-(4-amyloxyphenyl)-thiapyrylium perchlorate, and in Control B 0.8% Rhodamine B pigment were coated and evaluated as in Example 1. The results are shown in Table 6.

Table 6

| | Relative Electrical H and D Speed (Sh/100 V Toe) | | | | | |
|---|---|---|---|---|---|---|
| | Example 6 | | Control A | | Control B | |
| | + | − | + | − | + | − |
| phenyl-bis-(2-methyl-4-diethylaminophenyl)-arsine | 4500/158 | 1575/0 | *100/8 | 80/0 | 55/0 | 180/0 |
| triphenyl-2-methyl-4-diethylaminophenyl-stannane | 1750/0 | 1125/0 | 325/9.8 | 250/8.5 | 90/0 | 90/0 |
| phenyl-tris-(4-diethylaminophenyl)-stannane | 2500/0 | 1000/0 | 400/17.8 | 400/15.8 | 128/0 | 158/0 |
| triphenyl-p-diethyl-aminophenyl plumbane | 563/0 | 400/0 | 163/0 | 143/0 | 0/0 | 30/0 |
| methyl-tri-(p-diethyl-aminophenyl)silane | 3000/55 | 1125/20 | 400/22.5 | 400/20 | — | — |

*assigned an arbitrary speed value of 100 with all other listed values relative thereto.

EXAMPLE 7

A series of compositions containing Vitel PE-101 binder, 20% by weight of various photoconductor compositions and in Example 7, 1% by weight of Pigment Violet RB having the formula:

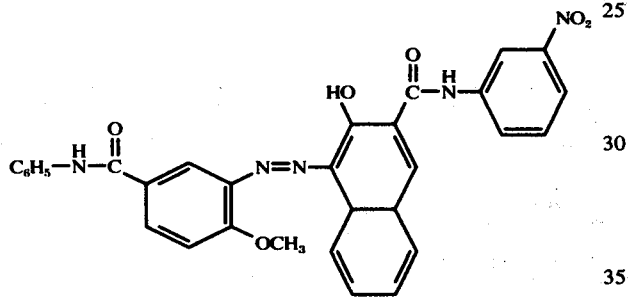

of this invention, in Control A no sensitizer and in Control B 1% by weight of Pigment Red having the formula

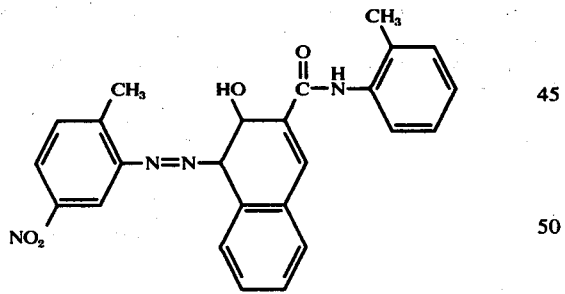

was prepared and coated as in Example 1. The results are shown in Table 7.

Table 7

| Photoconductor Combination | Example | Relative Electrical H & D Speeds (Sh/100 V Toe) | |
|---|---|---|---|
| 10% TNF + 10% triphenylamine | Control A | *100/6.5 | *100/4.0 |
| 10% TNF + 10% triphenylamine | Control B | 108/7.7 | 80/4.0 |
| 10% TNF + 10% triphenylamine | 7 | 615/34.6 | 400/16 |
| 10% TNF + 10% 4,4'-diethylamino-2,2'-dimethyltri-phenylmethane | Control A | 81/4.8 | 40/2.5 |
| 10% TNF + 10% 4,4'-diethylamino- | Control B | 92/5.5 | 55/2.5 |

Table 7-continued

| Photoconductor Combination | Example | Relative Electrical H & D Speeds (Sh/100 V Toe) | |
|---|---|---|---|
| 2,2'-dimethyltri-phenylmethane 10% TNF + 10% 4,4'-diethylamino-2,2'-dimethyltri-phenylmethane | 7 | 1538/61.5 | 650/2.5 |

*assigned an arbitrary speed value of 100.

EXAMPLES 8–9

A series of compositions containing Vitel PE 101 binder, 20% by weight of phenyl-tris(4-diethylaminophenylgermane) photoconductor and in Control A no pigment sensitizer, in Control B, 4% of Pigment red R having the formula

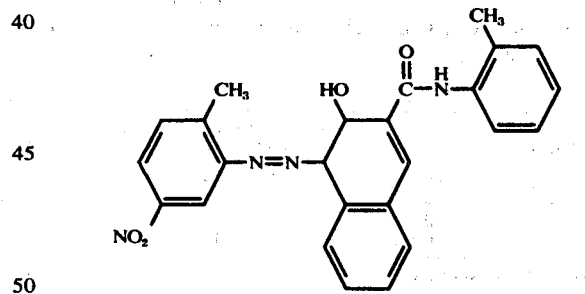

in Examples 8, 4% by weight of Malta Red X-2284 pigment having the formula

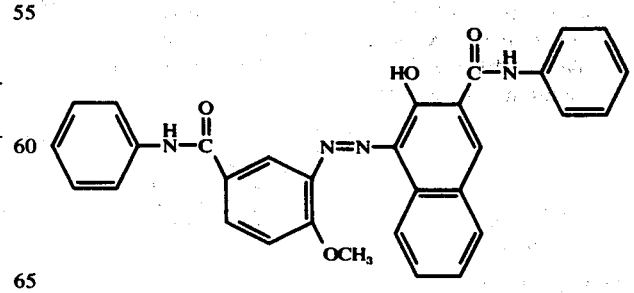

and in Example 9, 4% by weight of Pigment Violet RB having the formula

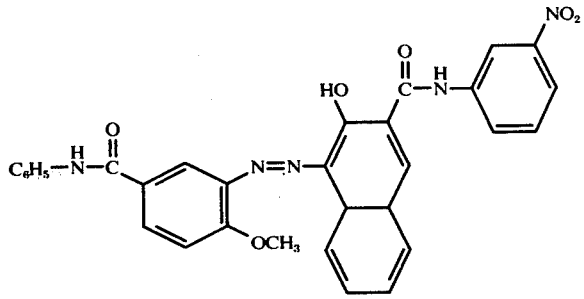

The compositions were coated as in Example 1. The results are shown in Table 8.

Table 8

| Example | Relative Electrical H & D Speeds (Sh/100 V Toe) | |
|---|---|---|
| Control A | *100/0 | *100/0 |
| Control B | 3088/73.5 | 1127/35 |
| 8 | 18529/941 | 10000/225 |
| 9 | 35294/1323 | 28169/380 |

*assigned an arbitrary speed value of 100.

EXAMPLES 10–12

A series of compositions containing Vitel PE 101 binder, 20% by weight of various photoconducts and 4% by weight of various milled pigments was prepared. The compositions were coated and tested as in Example 1. The results are shown in Table 9.

Table 9

| Example | Pigment* | Relative Electrical H & D Speeds (Sh/100 V Toe) | | | | | |
|---|---|---|---|---|---|---|---|
| | | Photoconductor A | | Photoconductor B | | Photoconductor C | |
| Control A | A | **100/0 | 90/0 | 500/0 | 300/9 | 63/0 | 100/0 |
| Control B | B | 0/0 | 0/0 | 0/0 | 6.3/0 | 6.3/0 | 8/0 |
| 10 | C | 23/0 | 35/0 | 30/0 | 13.8/0 | 13.8/0 | 35/0 |
| 11 | D | 900/25 | 700/11.3 | 6250/175 | 3500/113 | 5000/175 | 6250/300 |
| 12 | E | — | — | 2500/200 | 1900/68 | — | — |

**assigned an arbitrary speed value of 100 with all other listed speeds relative thereto.
*Formulas for pigments can be found on the followng pages.
Photoconductor A — triphenylamine
Photoconductor B — 4,4'-bis-diethylamino-2,2'-dimethyltriphenylmethane
Photoconductor C — 2,4,7-trinitrofluorenone Pigment C Pigment D

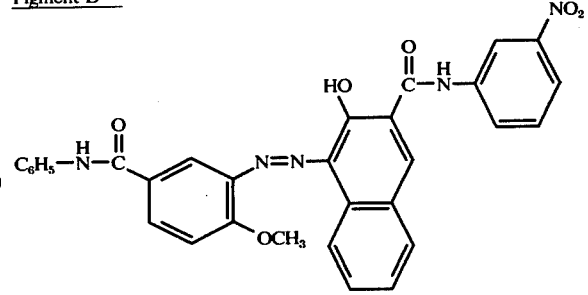

Pigment E

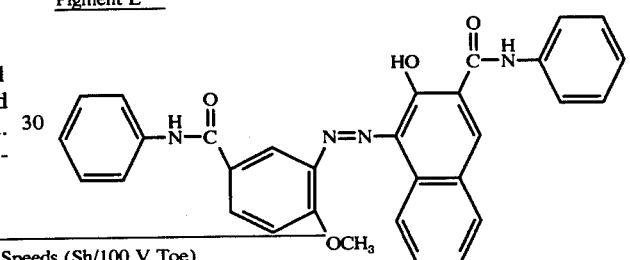

Pigment A

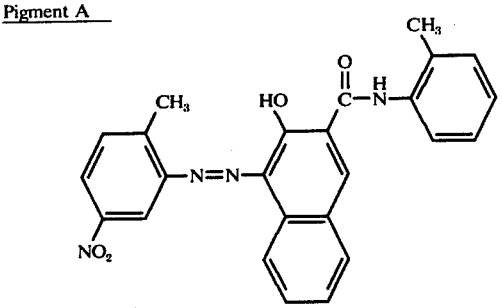

Pigment B

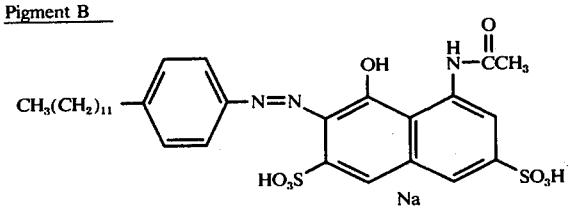

It is seen that low speeds were obtained using Control A and Control B as the sensitizer while high speeds were obtained using Examples 11 and 12 as the sensitizers. Although the actual recorded speeds of the composition containing Example 10 as the sensitizer were not high, the composition of Example 10 was a paste containing an unknown surfactant which desensitized the composition and the sensitizer was not completely dispersed in the composition.

The invention has been described in detail with particular reference to certain preferred embodiments thereof, but it will be understood that variations and modifications can be effected within the spirit and scope of the invention.

We claim:
1. A photoconductive composition comprising a photoconductor and a sensitizing amount of a sensitizer for the photoconductor comprising an organic pigment having the formula

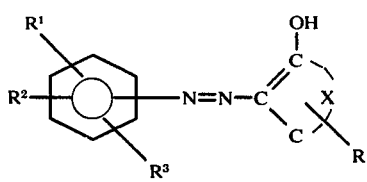

wherein X consists of the atoms necessary to complete a naphthalene, anthracene, or

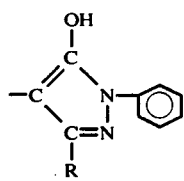

ring;
$R^1$, $R^2$, and $R^3$ are independently selected from the group consisting of hydrogen, halogen, alkoxy, $NO_2$, alkyl, $SO_3H$ or alkali metal salts thereof, and COOH or alkali metal salts thereof;

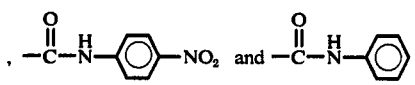

and wherein $R^2$ and $R^3$ can comprise the atoms necessary to complete a phenyl, naphthyl or anthryl ring; and R is selected from the group consisting of

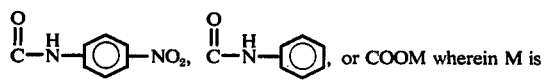

or COOM
wherein M is alkyl or an alkali or alkaline earth metal.

2. The photoconductive composition of claim 1 containing an electrically insulating polymeric binder.

3. A photoconductive composition comprising a photoconductor and a sensitizing amount of a sensitizer for the photoconductor comprising an organic pigment having the formula

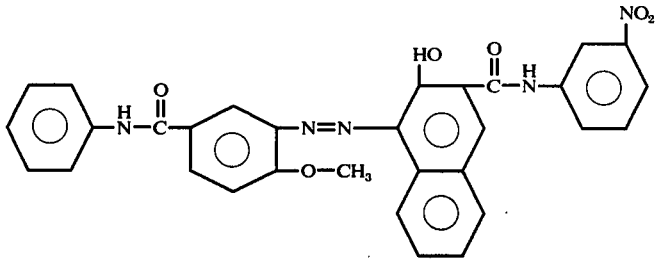

4. A photoconductive composition comprising a photoconductor and a sensitizing amount of a sensitizer for the photoconductor comprising an organic pigment having the formula

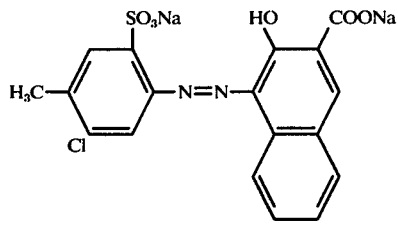

5. A photoconductive composition comprising a photoconductor and a sensitizing amount of a sensitizer for the photoconductor comprising an organic pigment having the formula

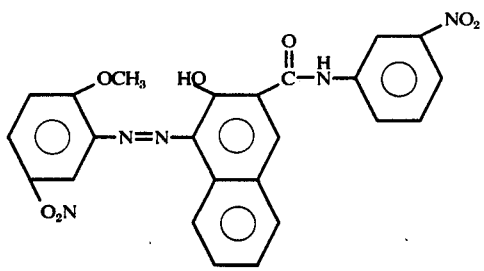

6. The photoconductive composition of claim 1 wherein the photoconductor is an organic photoconductor.

7. The photoconductive composition of claim 6 wherein the photoconductor is selected from the group consisting of arylamines, arylalkanes, organometallics and polymeric photoconductors.

8. The photoconductive composition of claim 1 wherein the photoconductor is an inorganic photoconductor.

9. The photoconductive composition of claim 8 wherein the inorganic photoconductor is selected from the group consisting of selenium, zinc oxide, titanium oxide, cadmium sulfide, cadmium selenide and lead oxide.

10. An electrophotographic element comprising a conductive support having coated thereon a photoconductive composition comprising a photoconductor and a sensitizing amount of a sensitizer for the photoconductor comprising an organic pigment having the formula

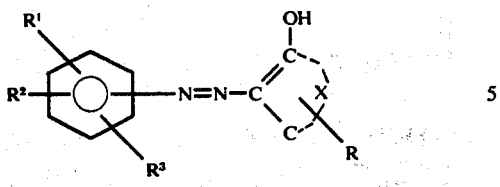

wherein X consists of the atoms necessary to complete a naphthalene, anthracene, or

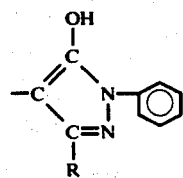

ring;
R¹, R², and R³ are independently selected from the group consisting of hydrogen, halogen, alkoxy, $NO_2$, alkyl, $SO_3H$ or alkali metal salts thereof, and COOH or alkali metal salts thereof;

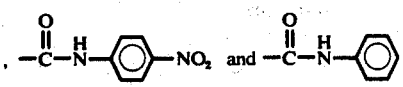

and wherein R² and R³ can comprise the atoms necessary to complete a phenyl, naphthyl or anthryl ring; and R is selected from the group consisting of

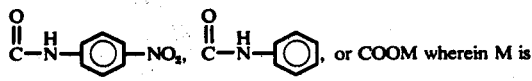

or COOM
wherein M is alkyl or an alkali alkaline earth metal.

11. The electrophotographic element of claim 10 wherein the photoconductor is dispersed in an electrically insulating polymeric binder.

12. The electrophotographic element of claim 10 wherein the organic pigment has the formula 13. The electrophotograhic element of claim 10 wherein the organic pigment has the formula

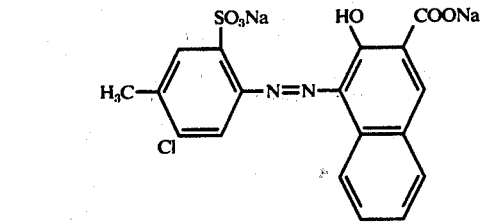

14. The electrophotographic element of claim 10 wherein the organic pigment has the formula

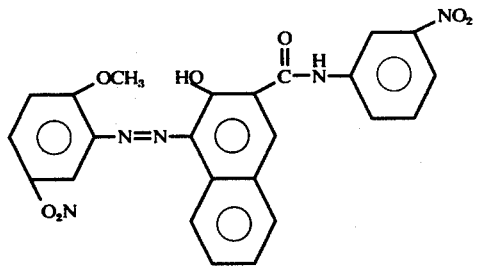

15. the electrophotographic element of claim 10 wherein the photoconductor is an organic photoconductor.

16. The electrophotographic element of claim 15 wherein the organic photoconductor is selected from the group consisting of arylamines, arylalkanes, organometallics and polymeric photoconductors.

17. The electrophotographic element of claim 10 wherein the photoconductor is an inorganic photoconductor.

18. The electrophotographic element of claim 10 wherein the inorganic photoconductor is selected from the group consisting of selenium, zinc oxide, titanium oxide, cadmium sulfide, cadmium selenide and lead oxide.

19. In an electrophotographic process wherein an electrostatic charge pattern is formed on an electrophotographic element the improvement characterized in that said electrophotographic element has a photoconductive layer comprising a photoconductor and a sensitizing amount of a sensitizer for the photoconduc-

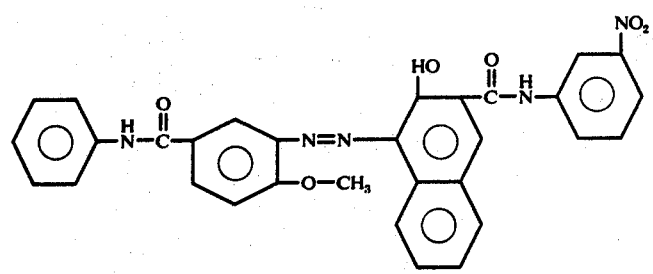

tor comprising an organic pigment having the formula

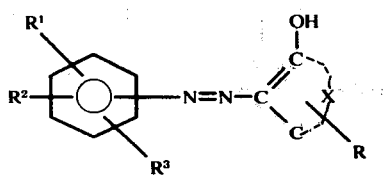

wherein X consists of the atoms necessary to complete a naphthalene, anthracene, or

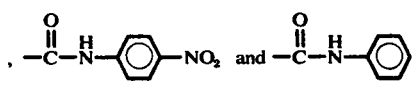

ring;
R$^1$, R$^2$, and R$^3$ are independently selected from the group consisting of hydrogen, halogen, alkoxy, NO$_2$, alkyl, SO$_3$H or alkali metal salts thereof; and COOH or alkali metal salts thereof;

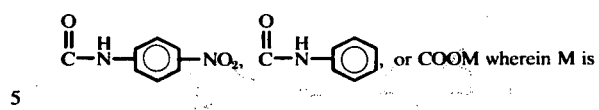

or COOM wherein M is alkyl or an alkali or alkaline earth metal.

20. The electrophotographic process of claim 19 wherein the photoconductor is dispersed in an electrically insulating polymeric binder.

21. The electrophotographic process of claim 19 wherein the organic pigment has the formula

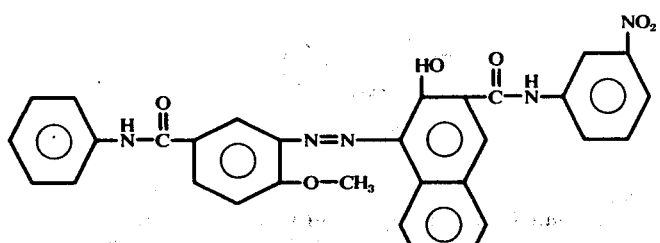

22. The electrophotographic process of claim 19 wherein the organic pigment has the formula

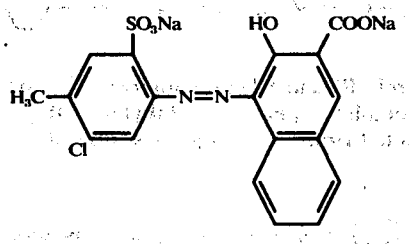

23. The electrophotographic process of claim 19 wherein the organic pigment has the formula

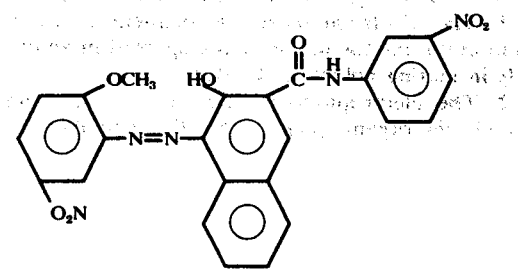

* * * * * and wherein R$^2$ and R$^3$ can comprise the atoms necessary to complete a phenyl, naphthyl or anthryl ring; and R is selected from the group consisting of